US006138570A

United States Patent [19]

Youngers et al.

[11] Patent Number: 6,138,570

[45] Date of Patent: Oct. 31, 2000

[54] METHOD AND APPARATUS FOR SAVING INK AND PRINTER BANDWIDTH WITH PREPRINTED TRANSPARENCIES

[75] Inventors: Kevin J Youngers, Greeley; Robert G Gann, Bellvue, both of Colo.

[73] Assignee: Hewlett-Packard Company, Palo Alto, Calif.

[21] Appl. No.: 09/285,209

[22] Filed: Apr. 1, 1999

[51] Int. Cl.[7] .............................. B41F 31/00; B32B 27/14

[52] U.S. Cl. .......................... 101/491; 101/211; 428/195; 347/188

[58] Field of Search ................................ 101/483, 401.1, 101/491, 211; 347/188, 105; 428/201, 195; 503/201; 400/241.1

[56] References Cited

U.S. PATENT DOCUMENTS

| | | | |
|---|---|---|---|
| 1,968,625 | 7/1934 | Wallach | 101/491 |
| 3,862,847 | 1/1975 | Newberger | 428/201 |
| 4,915,579 | 4/1990 | Afzali-Ardakani et al. | 400/241.1 |
| 4,996,537 | 2/1991 | Kishimi | 347/188 |
| 5,190,805 | 3/1993 | Atherton | 347/105 |
| 5,194,317 | 3/1993 | Sato et al. | 347/105 |
| 5,198,306 | 3/1993 | Kruse | 347/105 |
| 5,424,266 | 6/1995 | Gundjian | 503/201 |
| 5,885,927 | 3/1999 | Takahara et al. | 428/195 |

FOREIGN PATENT DOCUMENTS

| | | | |
|---|---|---|---|
| 13000 | 5/1897 | United Kingdom | 101/211 |

*Primary Examiner*—Eugene Eickholt
*Attorney, Agent, or Firm*—Cynthia S. Mitchell

[57] ABSTRACT

Transparent documents with precoated background so that only the text and foreground need to be printed by a printer is taught. Alternatively, the transparent documents may be precoated with watermarks, company logos, company confidential or other common background patterns. The printer may be able to selectively remove the background precoating from predetermined areas of the transparency where text or other foreground material will be printed. Alternatively, the ink in the printer may chemically dissolve the precoating in predetermined areas.

13 Claims, 4 Drawing Sheets

METHOD AND APPARATUS FOR SAVING INK AND PRINTER BANDWIDTH WITH PREPRINTED TRANSPARENCIES

FIELD OF THE INVENTION

The present invention relates generally to the field of printers and more particularly to a method and apparatus for saving ink and printer bandwidth by using preprinted color transparencies.

BACKGROUND OF THE INVENTION

Typically, end users find that a colored or dark background is most effective for overhead slides and transparencies. Generally, the background, foreground and text are all printed onto a document at the same time by a printer. However, the printing of background colors onto documents requires a great deal of ink and printing time. It would save ink and printing time if the printer did not have to print the background color onto every slide or transparent document.

SUMMARY OF THE INVENTION

The above and other aspects of the present invention are accomplished in a system that permits slides and transparent documents to have a precoated background so that only the text and foreground need to be printed by a printer. Alternatively, the transparent documents may come precoated with a watermark, company logo, company confidential or other common background pattern. The printer may be able to selectively remove the background precoating from predetermined areas of the transparency, or alternatively, the ink in the printer may comprise a chemical that dissolves the precoating.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
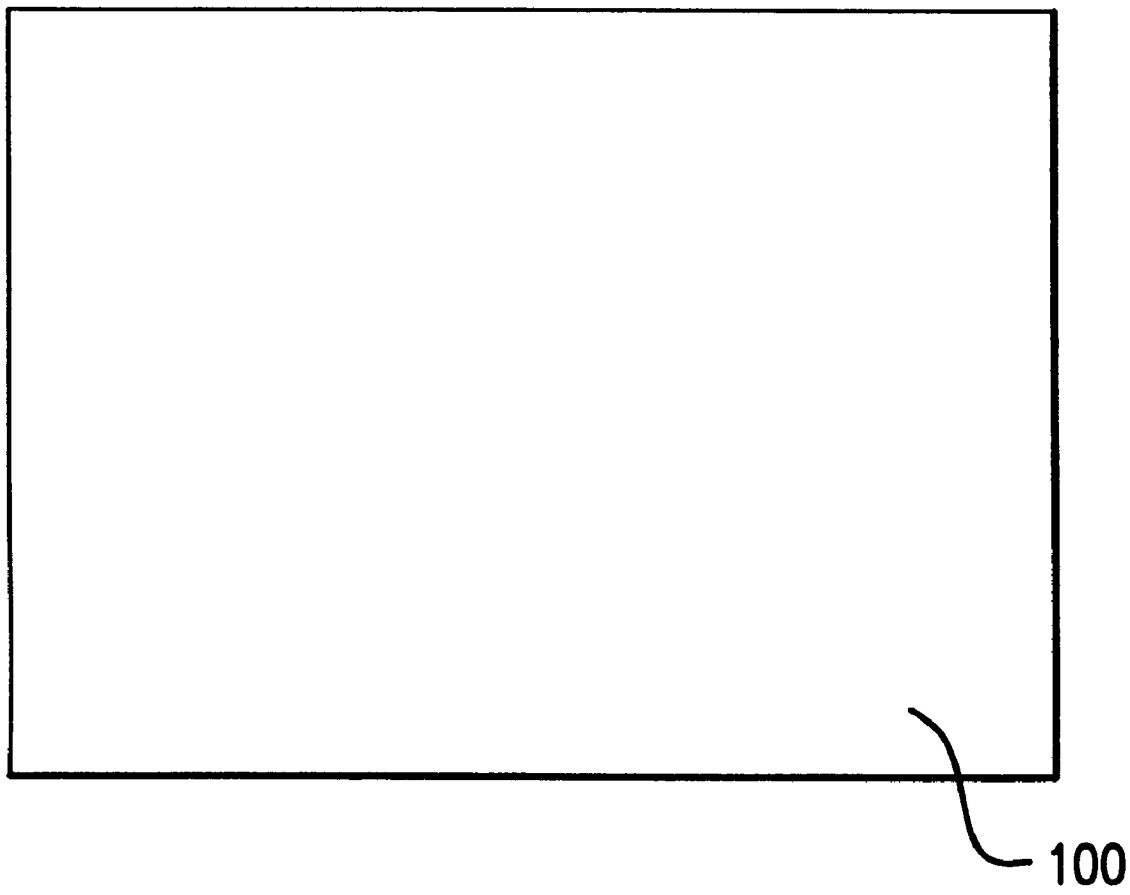
FIG. 1 illustrates a precoated color transparency according to the present invention.
Figure 2:
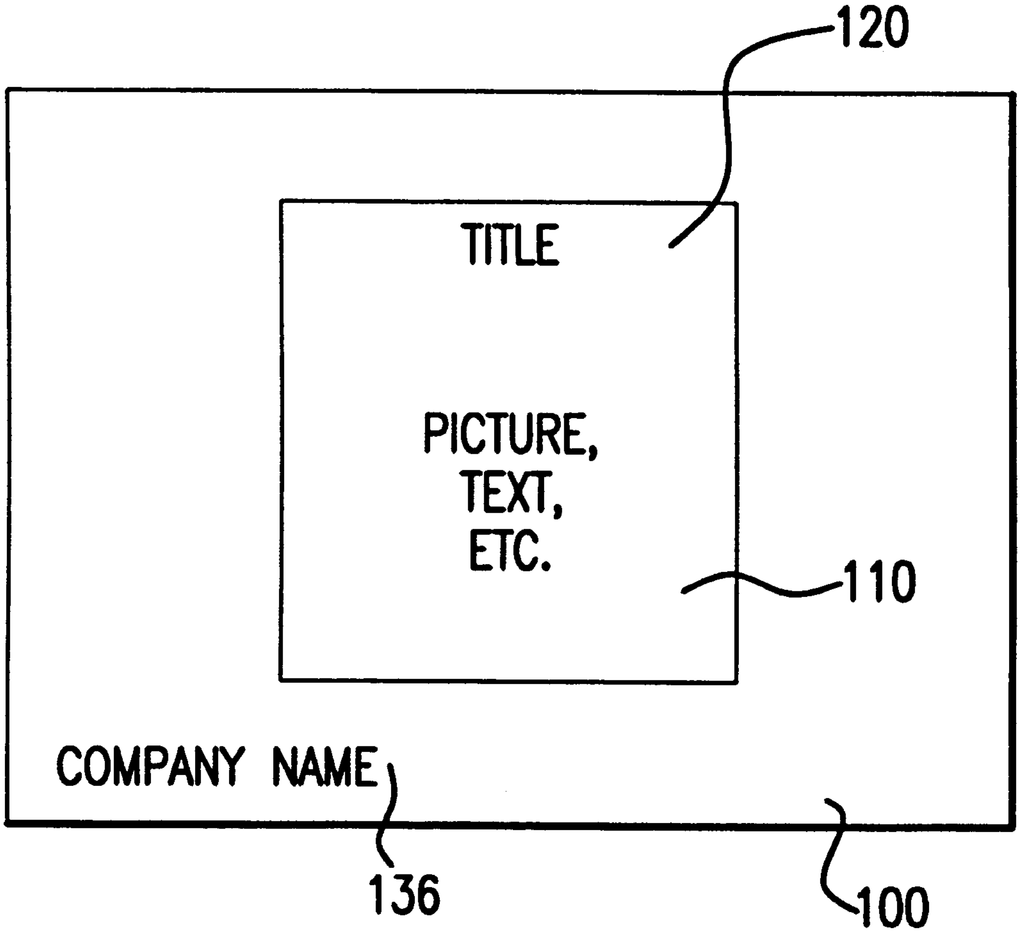
FIG. 2 illustrates a precoated color transparency with the color coating selectively removed from predetermined areas of the transparency according to the present invention.

FIG. 1 illustrates a precoated color transparency 100 according to the present invention. FIG. 2 illustrates a precoated color transparency 100 with the precoated background color selectively removed from areas 110, 120 and 130 where the title line, text, graphs, charts, pictures or other desired foreground areas will be printed. In practice, it is desirable to have a colored background on slides. The text, graphs, charts, pictures or other foreground materials may be printed by the printer directly onto the precoated color transparency.

One alternative embodiment may be that the user selects specific blocks where text or other foreground elements will be printed, such as areas 110, 120 and 130. Then a chemical may be applied by the printer to dissolve and remove the background precoated color from the preselected blocks on the transparency and then the text, graphs, charts, pictures or other foreground material will be printed onto the transparency by the printer.

Alternatively, the ink applied by the printer may contain a chemical that dissolves the precoating as the text and other foreground materials are being printed onto the transparency.

Precoated color transparencies may come in any color in the spectrum and the end user may select from any of the precoated color transparency colors as it suits his/her presentation needs and compliments and highlights the various color choices of the text, graphs, charts, pictures, drawings, etc. of any particular final transparency. The precoating for the background of the transparencies may comprise a readily dissolvable ink or stain. The chemical used to dissolve the background precoating may be any chemical or solution that will effectively dissolve the precoating without damaging the transparency or dissolving the ink being applied during the printing process. Alternatively, sufficient time between selectively removing the background precoating and printing the text and foreground material may be necessary.

As the present invention supplies the background printing of transparencies, during the printing process, only the text and foreground material need to be printed by the printer. Accordingly, the present invention will save printing time and printer ink. This should result in greater through put times and greater utilization of a printer.

Figure 3:
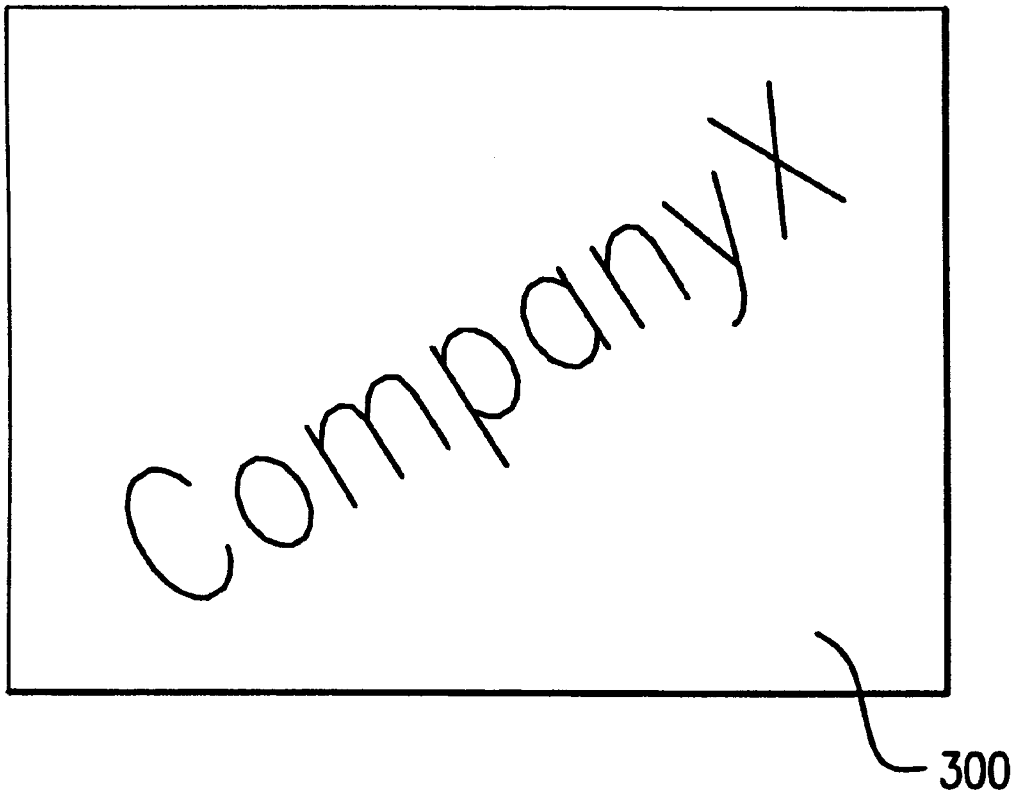
FIG. 3 illustrates a precoated transparency containing a company logo marking.
Figure 4:
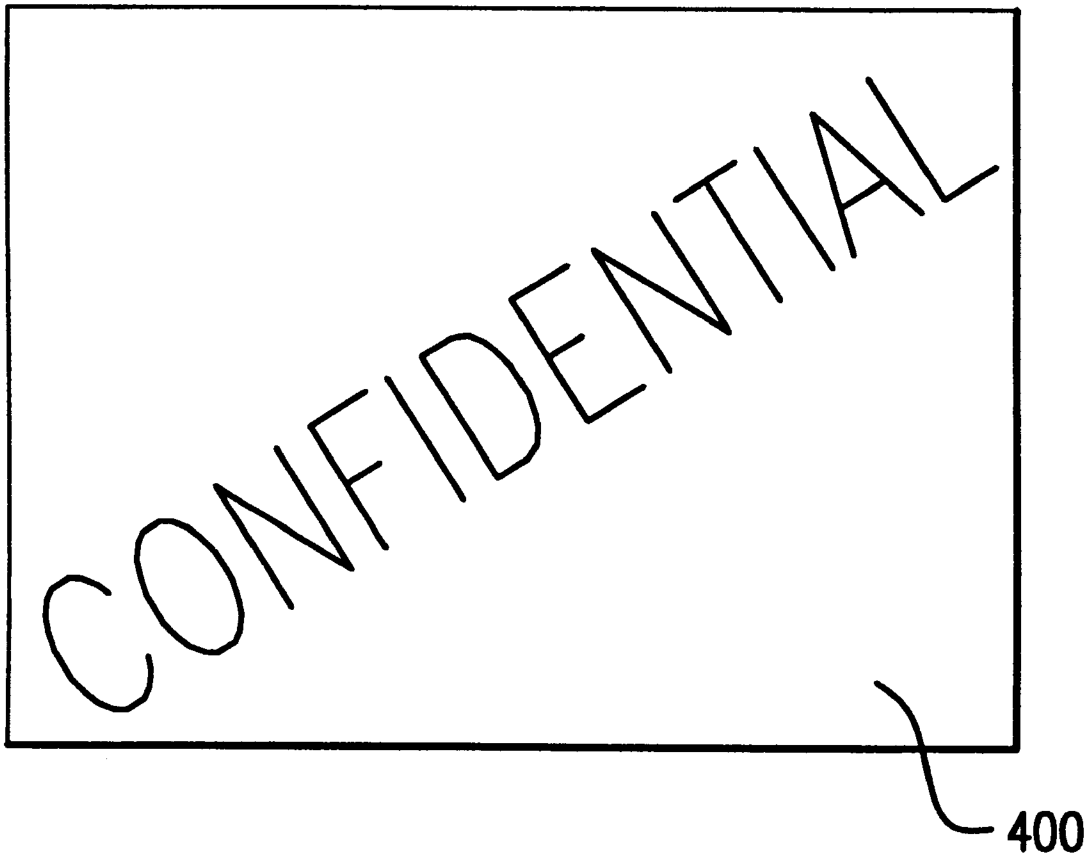
FIG. 4 illustrates a precoated transparency containing a confidential marking.

A printer may be loaded with variously different colored transparencies of some popular or effective background colors and the end user may indicate one background color for all of the transparencies or a different background color for each individual transparency in the batch. Alternatively, the printer or the software program used to create the slide presentation may select the color of each slide, based on what color would best compliment the text, graphs, charts, pictures, drawings or other foreground materials. Also, precoated color transparencies may come with more than one color precoated onto a single transparency, with a clean break between different colors or a fading pattern between the various different colors. The pattern of background precoatings may be along common patterns used for various different transparency presentation styles, such as bullet, graph, chart, etc. Alternatively, company logos (FIG. 3, 300), watermarks, company confidential (FIG. 4, 400) and other common background markings may be precoated onto transparent documents with a precoating that does not dissolve by the selectively applied dissolvent in order to save printer time and ink.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for printing a transparent document with a precoated background comprising:

(a) selectively removing the precoated background from predetermined areas of the transparent document;

(b) thereafter printing text or other foreground material onto the transparent document with a precoated background.

2. The method for printing a transparent document with a precoated background according to claim 1, wherein said selectively removing the precoated background comprises selectively applying a chemical that removes the background precoating to the transparent document.

3. The method for printing a transparent document with a precoated background according to claim 1, wherein said printing text or other foreground material onto the transparent document with a precoated background comprises printing said text or other foreground material in at least a portion of said predetermined areas of the transparent document.

4. The method for printing a transparent document with a precoated background according to claim 1, wherein said selectively removing the precoated background from predetermined areas of the transparent document comprises selectively dissolving said precoated background from said predetermined areas of the transparent document.

5. The method for printing a transparent document with a precoated background according to claim 4, wherein said selectively dissolving the precoated background from said predetermined areas of the transparent document comprises applying a chemical with a printer.

6. The method for printing a transparent document with a precoated background according to claim 5, wherein said printing text or other foreground material onto the transparent document with a precoated background comprises printing said text or other foreground material with said printer.

7. The method for printing a transparent document with a precoated background according to claim 1, wherein said precoated background comprises a watermark.

8. The method for printing a transparent document with a precoated background according to claim 1, wherein said precoated background comprises text.

9. A method for printing comprising:

providing a transparent sheet with a precoated background;

selecting at least one area on said transparent sheet;

removing said precoated background from said at least one area;

thereafter, printing foreground material onto said transparent sheet in at least a portion of said at least one area.

10. The method for printing of claim 9, and further comprising:

providing a chemical capable of removing said precoated background; and wherein said removing said precoated background comprises selectively applying said chemical to said at least one area.

11. The method for printing of claim 9, wherein said removing said precoated background comprises selectively dissolving said precoated background from said at least one area.

12. The method for printing of claim 11, wherein said selectively dissolving said precoated background comprises applying a chemical with a printer.

13. The method for printing of claim 12, wherein said printing foreground material onto said transparent sheet comprises printing said foreground material with said printer.

* * * * *